United States Patent
Ueno et al.

[11] 3,723,433
[45] Mar. 27, 1973

[54] PYRIMIDINYLPYRAZOLE DERIVATIVES AND METHODS FOR PREPARING THE SAME

[75] Inventors: Katsuhiro Ueno; Yoshiaki Ohmura; Reimei Moroi; Akira Akashi; Masahiro Arimoto; Akira Kasahara, all of Tokyo, Japan

[73] Assignee: Daiichi Seiyaku Co., Ltd., Tokyo, Japan

[22] Filed: July 31, 1970

[21] Appl. No.: 60,112

[30] Foreign Application Priority Data

Aug. 2, 1969 Japan..............................44/61218
Aug. 15, 1969 Japan............................44/64542

[52] U.S. Cl...................260/256.4 C, 260/256.4 N, 260/168 PH, 260/268 C, 260/999

[51] Int. Cl............................................C07d 51/42

[58] Field of Search..................260/256.4 N, 256.4 C

[56] References Cited

OTHER PUBLICATIONS

Adams et al., "Organic Reactions", Vol. I (1942) John Wiley Press, pp. 334–337

Primary Examiner—Donald G. Daus
Assistant Examiner—R. V. Rush
Attorney—Oblon, Fisher & Spivak

[57] ABSTRACT

Pyrimidinylpyrazole derivatives, having the formula:

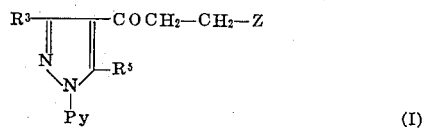

(I)

wherein $R_3$ and $R_5$ are each hydrogen or alkyl of one to five carbon atoms, Py is a pyrimidinyl group optionally substituted by alkyl of one to five carbon atoms, alkoxy of one to five carbon atoms, and/or halogen, Z is N-(optionally substituted)phenyl piperazino, 4-substituted piperidino or 4-substituted-1,2,5,6-tetrahydro pyridino. The compounds are useful either as C.N.S. depressants or as antihypertensive agents.

32 Claims, No Drawings

PYRIMIDINYLPYRAZOLE DERIVATIVES AND METHODS FOR PREPARING THE SAME

The present invention relates to novel pyrimidinylpyrazole derivatives and to a process for preparing the same, and more particularly to a compound having the following general formula (I):

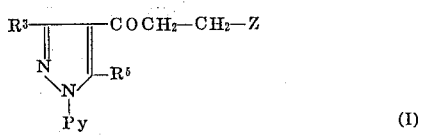

(I)

wherein $R^3$ and $R^5$ each represent a hydrogen atom or an alkyl group having one to five carbon atoms, Py represents a pyrimidinyl group which may have one or more substituents selected from the group consisting of an alkyl group having one to five carbon atoms, an alkoxy group having one to five carbon atoms, and a halogen atom; and wherein Z represents:

in which Q represents a phenyl group which may have one or more substituents selected from the group consisting of an alkyl group having one to five carbon atoms, an alkoxy group having one to five carbon atoms, a halogen atom and a trifluoromethyl group; and R represents a hydrogen atom or a hydroxy group.

The compound of this invention can be prepared by the Mannich reaction of an amine with formaldehyde or its functional equivalent, with a compound having the formula II:

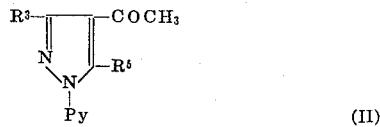

(II)

wherein $R^3$, $R^5$, and Py each have the same meaning as above. The amine useful in this invention has the structure "Z-H", wherein Z has the same meaning as above.

The starting material (II) is also a novel compound and can be synthesized by the following procedure: hydrazinopyrimidine derivatives of the formula $$Py-NHNH_2 \quad (III)$$

are heated with a compound of the formula:

(IV)

or

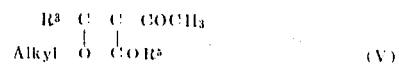

(V)

wherein Py, $R^3$ and $R^5$ have the same meaning as designated above. The reaction is conducted at a temperature of between room temperature and 80° C. in a suitable solvent, such as water, methanol, ethanol, dioxane or mixture thereof, to yield the compound designated by II.

The Mannich reaction may then proceed by heating a mixture of the raw materials at 50°C. – 100°C. in an inert solvent, such as ethanol or dioxane. Either an amine having the structure Z-H or a salt thereof such as monohydrochloride or monohydrobromide can be used in the reaction with good results. The term functional derivative of formaldehyde refers to a substance which is capable of providing formaldehyde in the reaction, such as paraformaldehyde. The product I can be isolated as a free base or a salt from the reaction mixture by conventional techniques.

The compounds represented by the formula I are highly active for depressing the central nervous system (C.N.S. depressant) or for reducing the blood pressure (antihypertensive), and accordingly are considered to be useful medicaments.

It is known that compounds having the following structure (VI) are useful as C.N.S. depressants and antihypertensive agents:

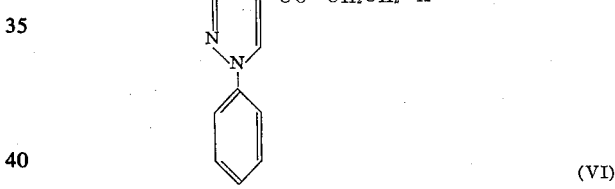

(VI)

wherein A in formula VI includes approximately the same radicals as those in the formula I. The compounds of formula VI, however, differ from those of formula I in that the prior art compounds VI possess a phenyl group attached to the $N^1$ of the pyrozole ring, whereas the compound I possesses a pyrimidinyl group. Unlike the compounds of VI, the compounds of formula I possess either a significant C.N.S. depressant activity or a significant antihypertensive activity, whereas the compounds of the formula VI will possess a significant degree of both characteristics. For example, referring to Table 1, it will be seen that the compounds designated as No. 1,330 and No. 1,530 show a high C.N.S. depressant activity and very low antihypertensive activity, and the compounds designated as No. 1440 and No.1430 show a very low C.N.S. depressant activity and high antihypertensive activity.

In contradistinction, 1-phenyl-4-(3-(4-o-tolyl-1-piperazinyl)1-oxopropyl 5-methyl-pyrazole hydrochloride (No.1,000 in Table 1) which is representative of the compounds VI of the prior art is characterized by both high C.N.S. depressant activity and high antihypertensive activity.

The coexistence of both C.N.S. depressant and antihypertensive activities limits the extent of clinical application in chemotherapy due to the very high probability of contraindication. From this point of view, the fact that the two activities have now been separated is believed to be of significant consequence, since these compounds can now be more readily used to provide specific desired effects without incurring the undesirable or often deleterious side effect of the opposite activity. Reference is now made to Tables I and II which compare the activity of the compounds of the present invention with those of the prior art:

TABLE I

| Compound No. 1 | C.N.S. depressant activity (ED 50 mg/kg) No. 2 | Antihypertensive activity No. 3 |
|---|---|---|
| No. 1330 | 3.6 | + |
| No. 1530 | 2.6 | + |
| No. 1000 | 18.4 | +++ |

TABLE II

| Compound No. 1 | C.N.S. depressant activity (ED 50 mg/kg) No. 2 | Antihypertensive activity No. 3 |
|---|---|---|
| No. 1440 | 86.1 | +++ |
| No. 1430 | 162 | +++ |
| No. 1340 | 200 | +++ |
| No. 1000 | 18.4 | +++ |

No. 1 No.1000: 1-phenyl-4-(3-(4-o-tolyl-1-piperazinyl)-1-oxopropyl)-5-methylpyrazole hydrochloride No.1330: 1-(2-pyrimidinyl)-4-(3-(4-p-fluorophenyl-1-piperazinyl)-1-oxopropyl)-5-methyl-pyrazole hydrochloride No.1530: 1-(2-pyrimidinyl)-4-(3-(4-o-fluorophenyl-1-piperazinyl)-1-oxopropyl)-5-methyl-pyrazole hydrochloride No1440: 1-(4,6-dimethyl-2-pyrimidinyl)-4-(3-(4-o-chlorophenyl-1-piperazinyl)-1-oxopropyl)-5-methylpyrazole hydrochloride hydrate No1430: 1-(4-methoxy-6-methyl-2-pyrimidinyl)-4-(3-(4-o-chloro-phenyl-1-piperazinyl)-1-oxopropyl)-5-methylpyrazole hydrochloride hydrate No1340: 1-(4-methoxy-6-methyl-2-pryimidinyl)-4-(3-(4-o-tolyl-1-piperazinyl)-1-oxopropyl)-5-methylpyrazole hydrochloride No. 2 The C.N.S. activity was determined by the rotarod test. Mice were placed on a wooden rod, 3 cm in diameter, and rotated at 14 r.p.m. Sideward movements on the rod was limited by two circular discs set 8.5 cm apart. Mice were given 2 minutes' training on the rod. Only those mice which could stay on the rod for at least 60 consecutive seconds were used in this test. These mice were orally administered the test compounds dissolved in water, and were given two test trials at 30 minutes, 1,2,3,and 4 hours, respectively, Each trial lasted a maximum of 60 seconds. Mice unable to stay on the rod for 60 consecutive seconds during both test trials were scored as being affected. $ED_{50}$ values were calculated according to the method of Litchfield and Wilcoxon from rates of response at the time when the maximum effect was observed.

No. 3 Renal hypertensive rats were prepared by the infraction method. The animals with stable systolic blood pressure levels, above 160 mmHg, were used for this test. Test compounds were dissolved in water and administered to the animals orally. The blood pressure was measured by tail plethysmography at 30 minutes, 1,2,4,6,and 24 hours following administration. The degree of the corresponding fall in blood pressure was expressed by the symbols:+++ (intensive), ++ (moderate), or + (slight).

Having generally described the invention, a more complete understanding can be obtained by reference to certain specific examples which are provided herein for purposes of illustration only and are not intended to be limiting in any manner.

PREPARATION OF STARTING MATERIAL (II)

EXAMPLE 1

To a solution of ethoxymethylene acetylacetone (3.30 g) dissolved in ethanol (40 g), 2-hydrazinopyrimidine (4.68 g) was added at 10° to 15°C. and warmed at 50° to 60°C. for 1 hour. The reaction solution was allowed to stand overnight to form a crystalline precipitate. This precipitate was collected by filtration. Secondary crystals were obtained by concentration of the filtrate and recrystallization from ethanol. The total yield of 1-(2-pyrimidinyl)-4-acetyl-5-methyl-pyrazole was 5.5 g which had a melting point of 130° to 131°C.

EXAMPLE 2

A mixture of ethoxymethylene acetylacetone (3.1 g), 4-methoxy-2-hydrazinopyrimidine (2.8 g), and ethanol (100 ml) was refluxed for 4 hours. The reaction solution was concentrated. The resulting crystals were collected by filtration and recrystallized from ethanol to give 4.2 grams of 1-(4-methoxy-2-pyrimidinyl)-4-acetyl-5-methyl pyrazole having a melting point of 117°–118°C.

Elementary analysis for $C_{11}H_{12}N_4O_2$:
Calcd   C 56.89   H 5.21   N 24.13
Found   C 56.66   H 4.94   N 23.80

EXAMPLE 3

To a suspension of 4,6-dimethyl-2-hydrazinopyrimidine (13.82 g) in methanol ethoxymethylene acetylacetone (17.18 g) was added dropwise with stirring at about 30°C. The reaction solution was then refluxed for 1 hour and concentrated in vacuo. The resulting crystals were collected by filtration and recrystallized from methanol to provide 21.68 grams of 1-(4,6-dimethyl-2-pyrimidinyl)-4-acetyl-5-methylpyrazole having a melting point of 100° to 103°C.

Elementary analysis for $C_{12}H_{14}N_4O$:
Calcd   C 62.59   H 6.13   N 24.33
Found   C 62.63   H 5.99   N 24.35

EXAMPLE 4

To a mixture of ethoxymethylene acetylacetone (3.12 g) and ethanol (20 ml), a solution of 4-methoxy-6-methyl-2-hydrazinopyrimidine (3.08 g) dissolved in ethanol was added dropwise at 5°–15°C. and heated to 50°C. for 1 hour. The residue, which was obtained from the reaction solution by means of concentration in vacuo, was recrystallized from ether to yield 1-(4-methoxy-6-methyl-2-pyrimidinyl)-4-acetyl-5-methylpyrazole (4.6 g) having a melting point of 126°C.

Elementary analysis for $C_{12}144O_2$:

Calcd   C 58.52   H 5.72   N 22.75
Found   C 58.27   H 5.57   N 22.95

EXAMPLE 5

A mixture of ethoxymethylene acetylacetone (3.94 g), 4-methoxy-5-bromo-6-methyl-2-hydrazinopyrimidine (5.61 g), and ethanol (100 ml) was refluxed for 2.5 hours. The reaction solution was concentrated in vacuo and the residue was dissolved in benzene. The benzene solution was subjected to chromatography in an alumina column. The column was eluted with benzene and then with a mixture of benzene and chloroform ( 95 : 5). The eluates were concentrated and the residue was recyrstallized from methanol to yield 1-(4-methoxy-5-bromo-6-methyl-2-pyrimidinyl)-4-acetyl-5-methylpyrazole (1.58 g) having a melting point of 160°– 163°C.

Elementary analysis for $C_{12}H_{13}N_4O_2Br$ :
Calcd   C 44.32   H 4.03   N 17.23   Br 24.57
Found   C 44.41   H 3.93   N 17.43   Br 25.03

EXAMPLE 6

To a solution of 4,6-dimethyl-2-hydrazinopyrimidine (8.51 g) and methanol (80 ml), ethoxymethylene acetylacetone (8.59 g) was added with stirring at about 30°C. and refluxed for 1 hour. The reaction solution was cooled and the resulting crystals were collected by filtration. The crystals were recrystallized from methanol to yield 1-(4,6-dimethoxy-2-pyrimidinyl)-4-acetyl-5-methylpyrazole (10.21 g) having a melting point of 124°– 126°C.

Elementary analysis for $C_{12}H_{14}N_4O_3$:
Calcd   C 54.95   H 5.38   N 21.37
Found   C 55.22   H 5.25   N 21.20

EXAMPLE 7

A mixture of ethoxymethylene-acetylacetone (7.8 g), 4-hydrazinopyrimidine (5.5 g) and ethanol (130 ml) was refluxed for 30 minutes. The crystals obtained from the reaction solution by concentration in vacuo were collected by filtration and recrystallized from methanol to yield 1-(4-pyrimidinyl)-4-acetyl-5-methylpyrazole (8.2 g) having a melting point of 134°– 135°C.

Elementary analysis for $C_{10}H_{10}N_4O$ :
Calcd   C 59.39   H 4.98   N 27.71
Found   C 59.24   H 4.97   N 27.55

EXAMPLE 8

A mixture of ethoxymethylene-acetylacetone (3.1 g), 6-methoxy-4-hydrazinopyrimidine (2.8 g) and ethanol (100 ml) was refluxed for 5 hours. The crystals obtained from the reaction solution by concentration in vacuo were collected by filtration and recrystallized from ethanol to yield 1-(6-methoxy-4-pyrimidinyl)-4-acetyl-5-methylpyrazole (4.0 g) having a melting point of 131°– 132°C.

Elementary analysis for $C_{11}H_{12}N_4O_2$:
Calcd   C 56.89   H 5.21   N 24.13
Found   C 56.72   H 4.97   N 24.48

PREPARATION OF PRODUCT COMPOUND I:

EXAMPLE 9

1-(2-pyrimidinyl)-4-acetyl-5-methylpyrazole (10.1 g), N-phenyl-piperazine monohydrochloride (9.9 g) and paraformaldehyde (9.0 g) were refluxed with ethanol (400 ml) for 40 hours. The reaction solution was concentrated in vacuo, and the residue was dissolved in water and extracted with ethyl acetate to remove the excess pyrazole. The water layer was alkalized with sodium bicarbonate and extracted with ethyl acetate. The extracted solution was washed with water, dried, and the solvent was removed. The residue was recyrstallized from methanol to yield 1-(2-pyrimidinyl)-5-methyl-4-[3-(4-phenylpiperazino)-1-oxopropyl]-pyrzaole having a melting point of 146° – 148°C.

Elementary analysis for $C_{21}H_{24}N_6O$ :
Calcd   C 67.00   H 6.43   N 22.33
Found   C 67.03   H 6.29   N 21.93

The crystals, with a melting point of 146° – 148°C., were treated with hydrochloric acid and recrystallized from methanol to obtain the hydrochloric acid salt having a melting point of 194° – 197°C.

Elementary analysis for $C_{21}H_{24}N_6O \cdot HCl$ :
Calcd   C 61.08   H 6.10   N 20.36   Cl 8.59
Found   C 60.48   H 6.34   N 20.34   Cl 8.12

EXAMPLE 10

A mixture of 1-(2-pyrimidinyl)-4-acetyl-5-methylpyrazole (1.01 g), N-o-tolyl-piperazine monohydrochloride (1.07 g) , paraformaldehyde (0.90 g) and ethanol (50 ml) were refluxed for 50 hours. The reaction solution was concentrated and the resulting crystals were collected by filtration, recrystallized from methanol to obtain 1-(2-pyrimidinyl)-5-methyl-4-[3-(4-o-tolylpiperazino)-1-oxopropyl]-pyrazole, hydrochloride having a melting point of 197° – 202°C. (decomp.).

Elementary analysis for $C_{22}H_{26}N_6O \cdot HCl$ :
Calcd   C 61.89   H 6.38   N 19.69   Cl 8.31
Found   C 61.76   H 6.81   N 19.91   Cl 8.69

EXAMPLE 11

A mixture of 1-(2-pyrimidinyl)-4-acetyl-5-methylpyrazole (5.06 g), N-p-tolyl-piperazine, monohydrochloride (5.31 g), paraformaldehyde (4.5 g) and ethanol (150 ml) was refluxed for 62 hours. The reaction solution was concentrated and the remaining syrup was dissolved in water. The excess pyrazole was removed by extraction with benzene. After the aqueous layer was allowed to stand, the resulting crystals were collected by filtration and recrystallized from a solution of methanol and ethanol to give 1-(2-pyrimidinyl)-5-methyl-4-[3-(4-p-tolylpiperazino)-1-oxopropyl]-pyrazole hydrochloride having a melting point of 195° – 196°C. (decomp.).

Elementary analysis for $C_{22}H_{26}N_6O \cdot HCl \cdot CH_3OH$
Calcd   C 60.19   H 6.81   N 18.31   Cl 7.72
Found   C 60.23   H 6.41   N 18.76   Cl 8.12

The above hydrochloride salt was neutralized with potassium carbonate and the resulting crystals were recrystallized from ether to yield a free base having a melting point of 108° – 109°C.

Elementary analysis for $C_{22}H_{26}N_6O$ :
Calcd   C 67.67   H 6.71   N 21.52
Found   C 67.87   H 7.14   N 22.08

EXAMPLE 12

A mixture of 1-(2-pyrimidinyl)-4-acetyl-5-methyl-pyrazole (10.1 g), N-o-chlorophenyl-piperazine,monohydrochloride (11.65 g), paraformaldehyde (9.0 g) and ethanol (250 ml) was refluxed for 40 hours. The reaction solution was treated in the same manner as in Example 11 and the resulting crystals were recrystallized from water to obtain 1-(2-pyrimidinyl)-5-methyl-4-[3-(4-o-chlorophenylpiperazino)-1-oxopropyl]-pyrazole hydrochloride having a melting point of 199° – 201°C. (decomp). (Yield: 60.2 percent)

Elementary analysis for $C_{21}H_{23}N_6OCl.HCl$
Calcd  C 56.38  H 5.41  N 18.79  Cl 15.85
Found  C 56.66  H 5.91  N 18.61  Cl 16.27

EXAMPLE 13

A mixture of 1-(2-pyrimidinyl)-4-acetyl-5-methyl-pyrazole (2.02g), N-m-chlorophenyl-piperazine.minohydrochloride (2.33 g), paraformaldehyde (1.8 g) and ethanol (25 ml) was treated in the same manner as in Example 12 to obtain 1-(2-pyrimidinyl)-5-methyl-4-[3-(4-m-chlorophenylpiperazino)-1-oxopropyl]-pyrazole hydrochloride having a melting point of 185° – 188°C. (decomp.). (Yield: 50.3 percent)

Elementary analysis for $C_{21}H_{23}N_6OCl.HCl$:
Calcd  C 56.38  H 5.41  N 18.79  Cl 15.85
Found  C 56.60  H 5.18  N 18.63  Cl 15.75

EXAMPLE 14

A mixture of 1-(2-pyrimidinyl)-4-acetyl-5-methyl-pyrazole (1.01 g),N-p-chlorophenyl-piperazine,monohydrochloride (1.17 g), paraformaldehyde (0.90 g) and ethanol (50 ml) was refluxed for 60 hours. After cooling,the resulting crystals were recrystallized from ethanol to obtain 1-(2-pyrimidinyl)5-methyl-4[3-(4-p-chlorophenylpiperazino-1-oxopropyl] pyrazole.hydrochloride having a melting point of 215° – 218°C. (decomp.).

Elementary analysis for $C_{21}H_{23}N_6OCl.HCl$:
Calcd  C 56.38  H 5.41  N 18.79  Cl 15.85
Found  C 56.41  H 5.56  N 18.40  Cl 15.75

EXAMPLE 15

A mixture of 1-(2-pyrimidinyl)-4-acetyl-5-methyl-pyrazole (2.02 g), N-p-fluorophenyl-piperazine.hydrochloride (2.17 g), paraformaldehyde (1.80 g), and ethanol (25 ml) was refluxed for 40 hours. After cooling,the resulting crystals were recrystallized from water to obtain 1-(2-pyrimidinyl)-5-methyl-4-[3-(4-p-fluorophenylpiperazino)-1-oxopropyl]-pyrazole.hydrochloride having a melting point of 197° – 203°C. (decomp.).

Elementary analysis for $C_{21}H_{23}N_6OF.HCl$ :
Calcd  C 58.53  H 5.61  N 19.51
Found  C 58.03  H 5.76  N 19.24

EXAMPLE 16

A mixture of 1-(2-pyrimidinyl)-4-acetyl-5-methyl-pyrazole (2.02 g),N-o-methoxyphenyl-piperazine.monohydrobromide (2.72 g), paraformaldehyde (1.80 g),and ethanol (100 ml) was refluxed for 40 hours. The reaction solution was treated in the same manner as in Example 12 to yield 1-(2-pyrimidinyl)-5-methyl-4-[3-(4-o-methoxyphenylpiperazino)-1-oxopropyl]-pyrazole.hydrobromide having a melting point of 199° – 200°C. (decomp.).

Elementary analysis for $C_{22}H_{26}N_6O_2.HBr.1.5H_2O$ :
Calcd  C 51.66  H 5.91  N 16.43  Br 15.63
Found  C 51.38  H 5.80  N 16.62  Br 15.40

EXAMPLE 17

A mixture of 1-(4-pyrimidinyl)-4-acetyl-5-methyl-pyrazole (5.05 g), N-phenyl-piperazine.monohydrochloride (5.65 g),paraformaldehyde (4.5 g),and ethanol (250 ml) was refluxed for 40 hours. After cooling,the resulting crystals were collected by filtration and washed with benzene. The crystals were recrystallized from water to yield 1-(4-pryimidinyl)-5-methyl-4-[3-(4-phenylpiperazino)-1-oxopropyl-]-pyrazole.hydrochloride having a melting point of 209° – 210°C.(decomp.).

Elementary analysis for $C_{21}H_{24}N_6O.HCl.1/4H_2O$:
Calcd  C 60.42  H 6.16  N 20.12  Cl 8.49
Found  C 60.48  H 6.28  N 19.91  Cl 8.39

EXAMPLE 18

A mixture of 1-(4-pyrimidinyl)-4-acetyl-5-methyl-pyrazole (1.01 g),N-o-tolyl-piperazine.monohydrochloride ((1.06 g),paraformaldehyde (0.90 g) and ethanol (50 ml) was refluxed for 40 hours. After cooling,the resulting crystals were collected by filtration and washed with ethyl acetate. The crystals were recrystallized from water to yield 1-(4-pyrimidinyl)5-methyl-4-5-[3-(4-o-tolylpiperazino)-1-oxopropyl]-pyrazole.hydrochloride having a melting point of 234° – 236°C. (decomp.).

Elementary analysis for $C_{22}H_{26}N_6O.HCl$ :
Calcd  C 61.89  H 6.38  N 19.69  CL 18.31
Found  C 61.67  H 6.26  N 19.64  Cl 8.12

EXAMPLE 19

A mixture of 1-(4-pyrimidinyl)-4-acetyl-5-methyl-pyrazole, (1.01 g), N-p-chlorophenyl-piperazine.monohydrochloride (1.17 g), paraformaldehyde (0.90 g) and ethanol (50 ml) was refluxed for 30 hours. After cooling,the resulting crystals were collected by filtration and washed with ethyl acetate. The crystals were recrystallized from water to yield 1-(4-pyrimidinyl)-5-methyl-4-[3-(4-p-chlorophenylpiperazino)-1-oxopropyl]-pyrazole.hydrochloride having a melting point of 218° – 219°C. (decomp.).

Elementary analysis for $C_{21}H_{23}N_6OCl.HCl$
Calcd  C 56.38  H 5.41  N 18.79
Found  C 56.54  H 5.53  N 18.77

EXAMPLE 20

A mixture of 1-(4-methoxy-2-pyrimidinyl)-4-acetyl-5-methylpyrazole (11.6 g) N-phenyl-piperazine.monohydrochloride (11.3 g), paraformaldehyde (9.0 g),and ethanol (500 ml) was refluxed for 40 hours. The reaction solution was concentrated in vacuo. A syrup obtained was dissolved in water and washed with benzene. The aqueous layer was concentrated. The resulting crystals from water to yield 1-(4-methoxy-2-pyrimidinyl)-5-methyl-4-[3-(4-phenyl-piperazino)-1-oxopropyl]-pyrazole.hydrochloride having a melting point of 193° – 194°C. (decomp.).

Elementary analysis for $C_{22}H_{26}N_6O_2HCl$ :

Calcd C 59.65 H 6.14 N 18.97 Cl 8.00
Found C 59.68 H 5.96 N 18.40 Cl 7.93

EXAMPLE 21

A mixture of 1-(6-methoxy-4-pyrimidinyl)-4-acetyl-5-methylpyrazole (11.6 g), N-phenyl-piperazine.monohydrochloride (11.3 g), paraformaldehyde (9.0 g), and ethanol (500 ml) was refluxed for 40 hours. The reaction solution was treated in the same manner as in Example 20 to yield 1-(6-methoxy-4-pyrimidinyl)-5-methyl-4-[3-(4-phenyl-piperazino)-1-oxopropyl]-pyrazole hydrochloride having a melting point of 199°–200°C. (decomp.).

Elementary analysis for $C_{22}H_{26}N_6O_2 \cdot HCl$:
Calcd C 59.65 H 6.14 N 18.97 Cl 8.00
Found C 59.63 H 6.14 N 19.25 Cl 7.96

Example 22

A mixture of 1-(4,6-dimethyl-2-pyrimidinyl)-4-acetyl-5-methylpyrazole (5.00 g), 4-phenyl-1,2,5,6,-tetrahydropyridine.hydrochloride (4.26 g), paraformaldehyde (5.0 g) and ethanol (60 ml) was refluxed for 38 hours. The reaction solution was concentrated in vacuo, warmed with benzene to crystallize and the resulting crystals were collected by filtration. The crystals were recrystallized from methanol to yield 1-(4,6-dimethyl-2-pryimidinyl)-4-[3-(4-phenyl-1,2,5,6,-tetrahydro-1-pryidyl)-1-oxopropyl-]-5-methylpyroazole.hydrochloride having a melting point of 170°–173°C.

Elementary analysis for $C_{24}H_{27}N_5O \cdot HCl \cdot 1/2 H_2O$:
Calcd C 64.49 H 6.54 N 15.67 Cl 7.93
Found C 64.50 H 6.53 N 16.04 Cl 7.75

EXAMPLE 23

A mixture of 1-(2-pyrimidinyl)-4-acetyl-3,5-dimethylpyrazole (432 mg), N-o-tolyl-piperazine.monohydrochloride (425 mg), paraformaldehyde (360 mg), and ethanol (20 ml) was refluxed for 40 hours. The reaction solution was concentrated. The resulting crystals were collected by filtration and recrystallized from ethanol to yield 1-(2-pyrimidinyl)-3,5-dimethyl-4-[3-(4-o-tolylpiperazino)-1-oxopropyl]-pyrazole.hydrochloride having a melting point of 184°–188.5°C.

EXAMPLE 24

A mixture of 1-(2-pyrimidinyl)-4-acetyl-5-methyl-pyrazole (6.06 g), 4-phenylpiperidine hydrochloride (5.90 g), paraformaldehyde (5.4 g) and ethanol (100 ml) was refluxed for 41 hours. A syrup obtained from the reaction solution by concentration was dissolved in water and the excessive starting materials were removed by extraction with benzene. The aqueous layer was treated with potassium carbonate to form a basic solution and extracted with benzene. The benzene solution was subjected to chromatography in a silica gel (30 g) column. The column was eluted with a mixture of chloroform and ethyl acetate (9 : 1) and with a mixture of chloroform and methanol (100 : 1). The eluates were treated with methanolic hydrogen chloride. The resulting crystals were recrystallized from water to yield 1-(2-pryimidinyl)-4-[3-(4-phenyl-1-piperidyl)-1-oxopropyl]-5-methyl-pyrazole.hydrochloride having a melting point of 176°–178.5°C.

Elementary analysis for $C_{22}H_{25}N_5O \cdot HCl \cdot 1/2 H_2O$:
Calcd C 62.77 H 6.47 N 16.64 C 18.42
Found C 62.90 H 6.28 N 16.81 Cl 8.53

EXAMPLE 25

A mixture of 1-(2-pyrimidinyl)-4-acetyl-5-methyl-pyrazole (3.03 g), 4-(4-chlorophenyl)-piperidine-4-ol hydrochloride (3.72 g), paraformaldehyde (2.70 g) and ethanol (60 ml) was refluxed for 42 hours. The resulting crystals were recrystallized from methanol to yield 1-(2-pyrimidinyl)-4-[3-(4-p-chlorophenyl-4-hydroxy-1-piperidyl)-1-oxopropyl]-5-methyl-pyrazole.hydroxhloride having a melting point of 218°–221°C.

Elementary analysis for $C_{22}H_{24}N_5O_2Cl \cdot HCl$:
Calcd C 57.15 H 5.45 N 15.15 Cl 15.38
Found C 57.21 H 5.24 N 15.41 Cl 15.69

EXAMPLE 26

A mixture of 1-(2-pyrimidinyl)-4-acetyl-5-methyl-pyrazole (5.05 g), 4-phenyl-1,2,5,6-tetrahydropropyridine.hydrochloride (4.89 g), paraformaldehyde (4.50 g) and ethanol (100 ml) was refluxed for 42 hours. A syrup obtained from the reaction solution by concentration was dissolved in water and extracted with benzene. The resulting crystals from the aqueous layer were collected by filtration and recrystallized from water to yield 1-(2-pyrimidinyl)-4-[3-(4-phenyl-1,2,5,6-tetrahydro-1-pyridyl)-1-oxopropyl]-5-methylpyrazole.hydrochloride with a melting point of 170°–173°C.

Elementary analysis for $C_{22}H_{23}N_5O \cdot HCl$:
Calcd C 64.46 H 5.90 N 17.08 Cl 8.65
Found C 64.20 H 6.60 N 16.78 Cl 8.48

EXAMPLE 27

A mixture of 1-(2-pryimidinyl)-4-acetyl-5-methyl-pyrazole (3.30 g), 4-(4-fluorophenyl)-1,2,5,6-tetrahydropyridine hydrochloride (3.50 g), paraformaldehyde (3.6 g) and ethanol (50 ml) was refluxed for 45 hours. The resulting crystals were collected by filtration and recrystallized from water and then from methanol to yield 1-(2-pyrimidinyl)-4-[3-(4-p-fluorophenyl-1,2,5,6-tetrahydro-1-pyridyl)-1-oxopropyl]-5-methylpyrazole.hydrochloride having a melting point of 198°–202°C.

Elementary analysis for $C_{22}H_{22}N_5OF \cdot HCl \cdot 1/2H_2O$:
Calcd C 60.47 H 5.54 N 16.03
Found C 60.27 H 5.75 N 16.19

EXAMPLE 28

A mixture of 1-(2-pyrimidinyl)-4-acetyl-5-methyl-pyrazole (1.62 g), 4-(4-chlorophenyl)-1,2,5,6-tetrahydropyridine.hydrochloride (1.84 g), paraformaldehyde (1.44 g) and ethanol (40 ml) was refluxed for 45 hours. The resulting crystals were collected by filtration and recrystallized from water to yield 1-(2-pyrimidinyl)-4-[3-(4-p-chlorophenyl)-1,2,5,6-tetrahydro-1-pyridyl)-1-oxopropyl]-5-methyl-pyrazole.hydrochloride with a melting point of 202°–204°C.

Elementary analysis for $C_{22}H_{22}N_5OCl \cdot HCl \cdot 1/2H_2O$:
Calcd C 58.25 H 5.34 N 15.45 Cl 15.64
Found C 58.17 H 4.97 N 15.58 Cl 15.77

EXAMPLE 29

A mixture of 1-(4,6-dimethyl-2-pyrimidinyl)-4-acetyl-5-methylpyrazole (5.00 g),4-phenyl-1,2,5,6-tetrahydropyridine.hydrochloride (4.26 g),paraformaldehyde (5.0 g) and methanol (60 ml) was refluxed for 38 hours. The reaction solution was concentrated in vacuo and warmed with benzene. The resulting crystals were collected by filtration and recrystallized from methanol to yield 1-(4,6-dimethyl-2-pyrimidinyl)-4-[3-(4-phenyl )-1,2,5,6-tetrahydro-1-pyridyl)-1-oxopropyl]-5-methylpyrazole.hydrochloride with a melting point of 170°–173°C.

Elementary analysis for $C_{24}H_{27}N_5OHCl.1/2H_2O$ :
Calcd   C 64.49   H 6.54   N 15.67   Cl 7.93
Found   C 64.50   H 6.53   N 16.04   Cl 7.75

EXAMPLE 30

A mixture of 1-(4-methoxy-6-methyl-2-pryimidinyl)-4-acetyl-5-methyl-pyrazole (2.46 g),N-o-tolyl-piperazine.monohydrochloride (2.13 g),paraformaldehyde (1.80 g) and ethanol (50 ml) was refluxed for 40 hours. After cooling, crystals precipitated were collected and recrystallized from water to yield 1-(4-methoxy-6-methyl-2-pyrimidinyl)-5-methyl4-(3-(4-tolylpiperazino)-1-oxopropyl pyrazole hydrochloride having a melting point of 209°–211°C. (decomp.).

Elementary analysis for $C_{24}H_{30}N_6O_2.HCl$ :
Calcd   C 61.20   H 6.63   N 17.89   Cl 7.53
Found   C 61.30   H 6.59   N 17.59   Cl 7.43

Having now described the invention,it will be apparent to one of ordinary skill in the art that many changes and modifications can be made without departing from the spirit or scope of the invention.

What is claimed as new and desired to be secured by letters patent is:

1. A compound represented by the formula:

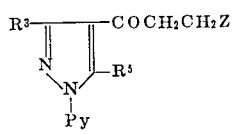

wherein $R^3$ and $R^5$ each represent a hydrogen atom or an alkyl group having one to five carbon atoms, Py represents a pyrimidinyl group which may have one or more substituents selected from the group consisting of an alkyl group having one to five carbon atoms, an alkoxy group having one to five carbon atoms, and a halogen atom, and wherein Z represents:

in which Q is a phenyl group or a substituted phenyl group having one or more substituents selected from the group consisting of an alkyl group having one to five carbon atoms, an alkoxy group having one to five carbon atoms, a halogen atom and a trifluoromethyl group, and R is a hydrogen atom or an hydroxy group.

2. The compound of claim 1 which is:
1-(2-pyrimidinyl)-5-methyl-4-(3-(4-phenyl-piperazino)-1-oxopropyl)-pyrazole.

3. The compound of claim 1 which is:
1-(2-pyrimidinyl)-5-methyl-4-[3-(4-o-tolyl-piperazino)-1-oxopropyl]-pyrazole.

4. The compound of claim 1 which is:
1-(2-pyrimidinyl)-5-methyl-4-[3-(4-p-tolyl-piperazino)-1-oxopropyl]-pyrazole.

5. The compound of claim 1 which is:
1-(2-pyrimidinyl)-5-methyl-4-[3-(4-o-chlorophenyl-piperazino)-1-oxopropyl]-pyrazole.

6. The compound of claim 1 which is:
1-(2-pyrimidinyl)-5-methyl-4-[3-(4-m-chlorophenylpiperazino)-1-oxopropyl]-pyrazole.

7. The compound of claim 1 which is:
1-(2-pyrimidinyl)-5-methyl-4-[3-(4-p-chlorophenl-piperazino)-1-oxopropyl]-pyrazole.

8. The compound of claim 1 which is: 1-(2-pyrimidinyl)-5-methyl-4-[3-(4-p-fluorophenylpiperazino)-1-oxopropyl]-pyrazole.

9. The compound of claim 1 which is:
1-(2-primidinyl)-5-methyl-4-[3-(4-o-methoxyphenylpiperazino)-1-oxopropyl]-pyrazole.

10. The compound of claim 1 which is:
1-(4-pyrimidinyl)-5-methyl-4-[3-(4-phenyl-piperazino)-1-oxopropyl]-pyrazole.

11. The compound of claim 1 which is:
1-(4-pyrimidinyl)-5-methyl-4-[3-(4-o-tolypiperazino )-1-oxopropyl]-pyrazole.

12. The compound of claim 1 which is:
1-(4-pyrimidinyl)-5-methyl-4-[3-(4-p-chlorophenyl-piperazino)-1-oxopropyl]-pyrazole.

13. The compound of claim 1 which is:
1-(4-methoxy-2-pyrimidinyl)-5-methyl-4- [3-(4-phenylpiperazino)-1-oxopropyl]-pyrazole.

14. The compound of claim 1 which is:
1-(6-methoxy-4-pyrimidinyl)-5-methyl-4-[3-(4-phenylpiperazino)-1-oxopropyl]-pyrazole.

15. The compound of claim 1 which is:
1-(4,6-dimethyl-2-pyrimidinyl)-4-[3-(4-phenyl-1,2,5,6-tetrahydro-1-pyridyl)-1-oxopropyl]-5methylpyrazole.

16. The compound of claim 1 which is:
1-(2-pyrimidinyl)-3,5-dimethyl-4-[3-(4-o-tolyl-piperazino)-1-oxopropyl]-pyrazole.

17. The compound of claim 1 which is:
1-(2-pyrimidinyl)-5-methyl-4-[3-(4-phenyl-1-piperidyl)-1-oxopropyl]-pyrazole.

18. The compound of claim 1 which is:
1-(2-pyrimidinyl)-5-methyl-4-[3-(4-p-chlorophenyl-4-hydroxy-1-piperidyl)-1-oxopropyl]-pyrazole.

19. The compound of claim 1 which is:
1-(2-pyrimidinyl)-5-methyl-4-[3-(4-p-fluorophenyl-1,2,5,6-tetrahydro-1-pyridyl)-1-oxopropyl]-pyrazole.

20. The compound of claim 1 which is:
1-(2-pyrimidinyl)-5-methyl-4-[3-(4-phenyl-1,2,5,6-tetrahydro-1-pyridyl)-1-oxopropyl]-pyrazole.

21. The compound of claim 1 which is:

1-(2-pyrimidinyl)-5-methyl-4-[3-(4-p-chlorophenyl-1,2,5,6-tetrahydropyridyl)-1-oxopropyl]-pyrazole.
22. The compound of claim 1 which is:
1-(4,6-dimethyl-2-pyrimidinyl)-5-methyl-4-[3-(4-phenyl-1,2,5,6-tetrahydro-1-pyridyl)-1-oxopropyl]-pyrazole.
23. The compound of claim 1 which is:
1-(4-methoxy-6-methyl-2-pyrimidinyl)-5-methyl-4-[3-(4-o-tolylpiperazino)-1-oxopropyl]-pyrazole.
24. A compound represented by the formula:

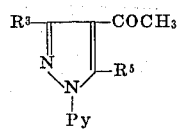

wherein $R^3$ and $R^5$ each represent a hydrogen atom or an alkyl group having one to five carbon atoms and Py represents a pyrimidinyl group having one or more substituents selected from the group consisting of an alkyl group having one to five carbon atoms, an alkoxy group having one to five carbon atoms, and a halogen atom.
25. The compound of claim 24 which is:
1-(2-pyrimidinyl)-4-acetyl-5-methyl-pyrazole.
26. The compound of claim 24 which is:
1-(4-methoxy-2-pyrimidinyl)-4-acetyl-5-methyl-pyrazole.
27. The compound of claim 24 which is:
1-(4,6-dimethyl-2-pyrimidinyl)-4-acetyl-5-methyl-pyrazole.
28. The compound of claim 24 which is:
1-(4-methoxy-6-methyl-2-pyrimidinyl)-4-acetyl-5-methyl-pyrazole.
29. The compound of claim 24 which is:
1-(4-methoxy-5-bromo-6-methyl-2-pyrimidinyl)-4-acetyl-5-methyl-pyrazole.
30. The compound of claim 24 which is:
1-(4,6-dimethoxy-2-pyrimidinyl)-4-acetyl-5-methyl-pyrazole.
31. The compound of claim 24 which is:
1-(4-pyrimidinyl)-4-acetyl-5-methyl-pyrazole.
32. The compound of claim 24 which is:
1-(6-methoxy-4-pyrimidinyl)-4-acetyl-5-methyl-pyrazole.

* * * * *